Oct. 1, 1957      C. E. BELTRÁN SIMÓ      2,808,159
MOVABLE PLATFORM FOR SELF UNLOADING VEHICLES
Filed June 9, 1955      2 Sheets-Sheet 1
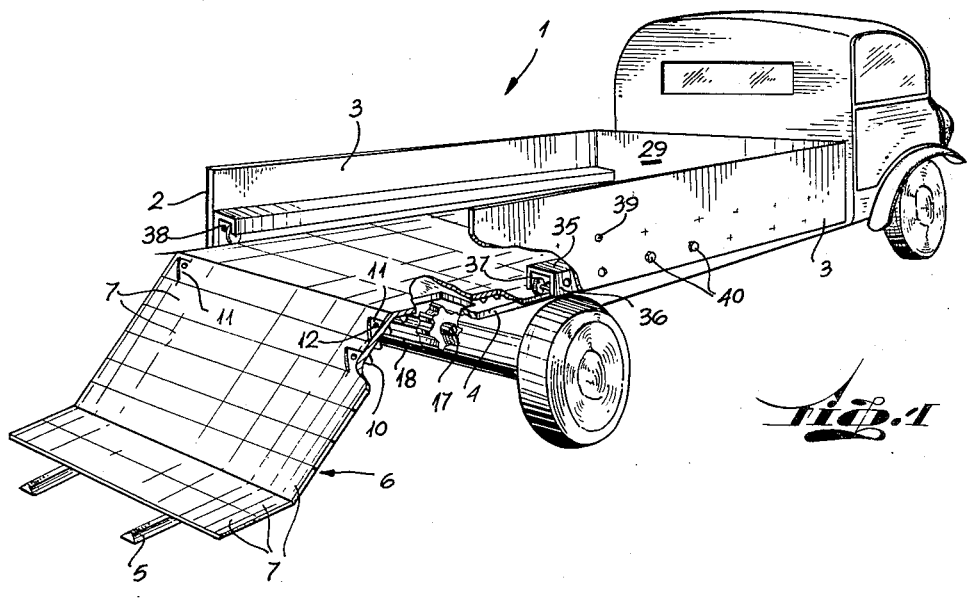
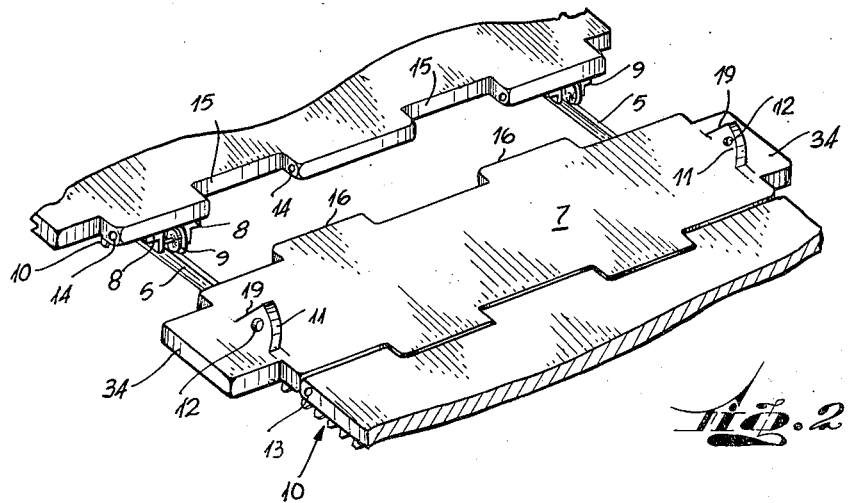
INVENTOR.
Carlos Enrique Beltran Simó
BY
Mason and Mason Oct. 1, 1957 C. E. BELTRÁN SIMÓ 2,808,159
MOVABLE PLATFORM FOR SELF UNLOADING VEHICLES
Filed June 9, 1955 2 Sheets-Sheet 2
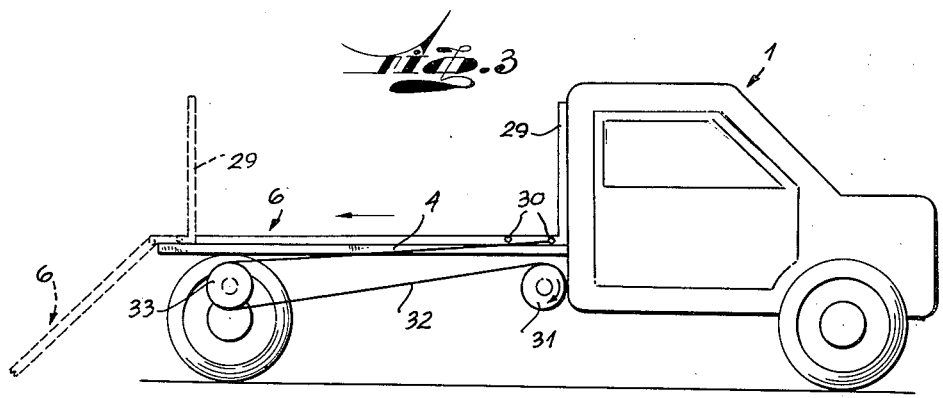
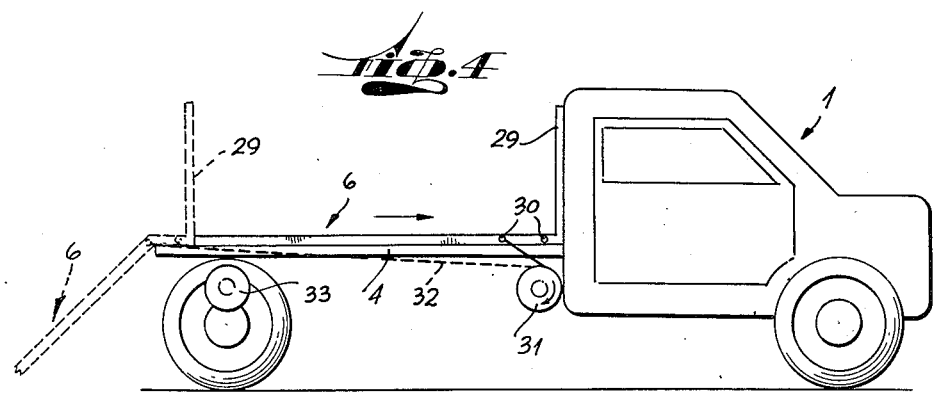
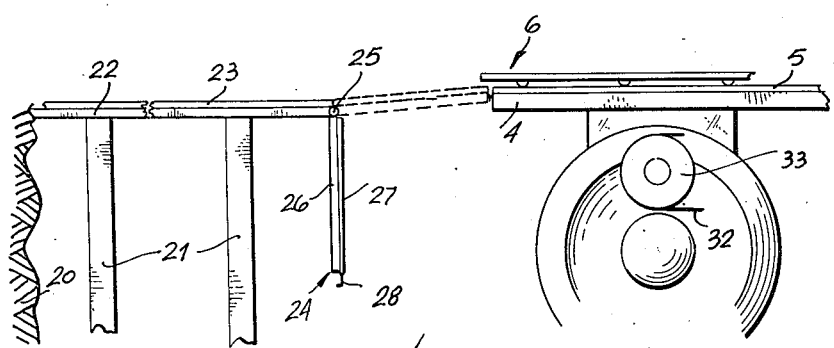
INVENTOR.
Carlos Enrique Beltran Simó
BY
Mason and Mason

യ2,808,159

MOVABLE PLATFORM FOR SELF UNLOADING VEHICLES

Carlos E. Beltrán Simó, Banfield, Argentina

Application June 9, 1955, Serial No. 514,243

4 Claims. (Cl. 214—83.34)

The present invention refers to a transportable platform for the transportation of goods, and more particularly to a platform which may be mounted on and dismounted from a vehicle whilst carrying a load of goods.

The invention further refers to vehicles adapted to carry and to discharge such platform.

Goods vehicles such as for example trucks cannot be used whilst the goods are loaded on or unloaded from the vehicle. The work of loading and unloading frequently takes a considerable period of time especially when goods are concerned (such as, for instance, bricks, boxes containing eggs, fruit, etc.), which must be piled up rather carefully either on the vehicle or at the place to which they have been transported. In some cases the loading and unloading of the vehicle may take the same or even more time than the actual trip so that the vehicle is not available for the transport of further batches during a period of time greater than that of the actual trip.

One of the principal purposes of the present invention is to overcome this difficulty and it is based on the idea of utilizing a movable platform which may be loaded before it is placed on the vehicle and unloaded after it has been removed therefrom.

More particularly, a principal object of the invention is to provide a platform of the type specified which comprises means adapting the same to slide over the supporting surface of the vehicle or of a storing place and the like.

Another object of the invention is to provide a movable platform of the type specified which is articulated so that it may move out and from a vehicle even when there is a considerable difference between the level of the storing surface and the level of the platform supporting surface of the vehicle.

A further object of the invention is to provide a platform of the type discribed comprising means for securing the goods on the platform against relative movement especially whilst the same is moving between different levels.

An additional object of the invention is to provide a vehicle, more particularly an automotive vehicle, comprising means for moving the platform onto and from the vehicle.

The foregoing and other objects of the invention will become evident from the following detailed description of some embodiments of the invention which have been illustrated by way of example in the accompanying drawings, wherein:

Figure 1 is a perspective schematical view of a truck and a platform according to one embodiment of the invention, some parts being shown as broken away to facilitate the illustration of other parts;

Figure 2 is a perspective view of a fraction of the platform shown in Figure 1;

Figures 3 and 4 are schematical side elevations of a truck and a platform according to another embodiment of the invention; and Figure 5 is a cross sectional side elevation of an auxiliary device used in connection with either embodiment.

Throughout the several figures of the drawings the same reference numerals and characters have been used in order to designate equal or corresponding parts of the invention.

Referring first to Figures 1 and 2, it will be seen that the invention is shown as applied to a truck 1 having at its forward end an engine (not shown) for driving the same. The body of truck 1 comprises an upwardly open box-like structure 2 for goods (not shown) laterally confined between side walls 3, 3 which may be fixed to the bottom portion 4, and or may be removably secured or hinged thereto.

As seen in Figure 2, on the bottom 4 of the box-like structure 2 there are mounted two parallel rails 5, 5 which extend parallel to the side walls 3 from the forward end to the rear end of the box-like body structure. These rails 5, 5 support a movable platform generally indicated at 6.

The movable platform 6 comprises a plurality of transverse sections 7 each consisting preferably of a wooden board or the like, the boards being aligned longitudinally of the truck so that their upper faces define a continuous load supporting surface. The transverse members 7 may also be made from metal or from some other relatively light load-resisting material.

Each transverse member 7 has, near each lateral end, a pair of inverted L-section members 8, 8 firmly secured to the lower face of the respective member 7. On the downwardly extending flanges of members 8 the axles of rollers or wheels 9 are mounted for rotary movement of such rollers or wheels which are so spaced apart that they are adapted to move on the rails 5 of the truck.

Outwardly of the rollers or wheels 9, each member 7 is provided with a rack 10 parallel or coextensive with the respective lateral end of the board 7. Each member 7 further comprises a pair of upwardly extending lugs 11 which are provided for the purpose of laterally securing the goods to be placed on platform 6 and their openings 12 serve for passing therethrough if necessary or desired, rods or ropes for holding the goods against relative movement lengthwise of platform 6. Each lug 11 further comprises at its rear end a substantially straight portion 19 so that bars may be transversely placed on each pair of lugs to provide transverse tops for the goods.

Outwardly of lugs 11, each transverse member 7 is provided with a lateral extension 34 adapted to be engaged by guide members 35 which preferably comprise an inverted U rail 36 extending over the full length of each lateral wall 3, and having rollers 37 mounted for rotary movement on transverse shafts 38 and protruding from the downwardly open rails 36. Each side wall is provided wtih means such as openings 39 at which the rails 36 may be secured by screws 40 or the like. Preferably, several horizontal rows may be arranged to enable the rails to be adjusted at different levels.

At least one of the end members 7a may include an end wall 29 extending perpendicularly thereto, and which preferably is removably secured by means not shown.

Each transverse member 7 is pivoted to the next adjacent member 7 by any suitable means which according to Figure 2 comprises a pin 13 inserted in a bore 14 arranged at the forward end and rear ends of the transverse member 7. The forward end of the intermediate member 7 includes recesses 15 adapted to receive the projections 16 of the rear end of the adjacent member. Such projections 16 also include said transversely extending bore so that the pin 13 passes therethrough whereby two adjacent members 7 are secured together for pivotal movement on the pin 13. To facilitate such pivotal movement, the forward and rear ends of the boards 7 may be rounded, and the recesses and projection 15, 16 should be sufficiently deep so as to allow for proper spacing of the members 7.

In order to move the platform 6 onto and from the truck 1 the latter is provided with a mechanism which includes a pair of pinions 17 secured to a shaft 18 arranged at the rear end of truck 1 and extending transversely thereof.

These pinions 17 engage the lateral racks 10 of the individual members 7 of platform 6. Said mechanism also includes preferably a suitable transmission (not shown) adapted to convert the movement of an engine driven part into relative slow rotary movement of the shaft 18 (and therefore of pinions 17) in either direction.

When it is desired to load a truck 1, the goods are placed on the platform 6, which of course, at this moment is not on the truck. It may rest on a suitable floor, or preferably an auxiliary device as shown by way of example in Fig. 5 may be used. Such device is mounted on a suitable base 20 such as for instance a loading platform, and/or it may be provided with suitable frame members 21 adapted to support the top plate 22 which is of a length and width preferably somewhat greater than that of an average platform 6. The lower ends of frame members 21 may be provided, if desired, with wheels. The top plate 22 comprises a pair of longitudinally extending parallel rails 23, spaced apart in the same way as rails 5 of truck 1.

At one of its ends, the top plate 22 includes a pivotal extension 24 hinged at 25 to the top plate 22 for swinging movement. The extension 24 comprises a plate 26 preferably of the same width as top plate 22, and a pair of rails 27 on such plate 26, which rails are prolongations of rails 23. At its free end, the extension 24 is provided with a pair of hooks or the like 28.

The platform 6 is placed on the auxiliary device described, and the goods to be transported are then placed on the platform. Truck 1 is then backed to a position wherein it is properly aligned with the platform 6. If there is a difference in the level of the floor 4 of truck 1 and that of platform 6, the truck is stopped at such a distance from the auxiliary device described that the extension 24 may be swung into such a position that it bridges the space between the rear end of the truck and the adjacent end of platform 6. By means of hooks 28, the pivotal extension 24 may be secured to the truck.

The platform is then moved longitudinally towards the truck until the racks 10 are engaged by the pinions 17. The auxiliary device may include suitable mechanical means for causing such longitudinal movement. As soon as pinions 17 engage the racks 10, the engine of the truck 1 will furnish the power for moving the platform 6 with the goods thereon, until it is in its full length supported on the floor 4 of the truck. It may be secured in such position by any suitable means and the truck may start its strip to the storing place where a similar auxiliary device may be provided to facilitate the removal of the platform, 6, from truck 1, which is effected by driving pinions 17 in a proper direction (opposite to that of loading). As soon as the platform 6 has been removed from the truck 1, the latter may be used while the goods are taken from platform 6. It will be appreciated that during the movement of the platform 6, and especially where there is a difference of levels, the goods are safely secured to the platform by end plates 29, lugs 11 and, if desired by transverse rope or rods associated with lugs 11, and which may be employed when advisable according to the nature of the goods.

Figs. 3 and 4 show a modified embodiment. Whilst the general arrangement of the platform 6 is the same the several transverse members 7 thereof and the rollers or wheels 9 have not been shown for the sake of clear illustration of those features which in this modified form are different from that shown in Figs. 1 and 2. These features comprise laterally protruding hooks or pins 30 associated with the end member 7a at the forward end of the platform 6 and with at least one intermediate member 7. According to this embodiment the platform 6 is not provided with racks corresponding to those indicated in Figs. 1 and 2, at 10 and the truck, instead of having pinions 17 mounted on shaft 18, is provided with a pair of lateral drums 31 and a mechanism (not shown) for imparting to the drum 31 from the engine a rotary movement in the direction indicated by the arrows in Figs. 3 and 4. The drums are located at the lateral sides of the truck above the floor 4 thereof in the space between the floor 4 and the platform 6.

At the opposite end of the truck 1, a pair of pulleys 33 is aligned with drums 31 and a cable 32 is wound on each drum 31. In Fig. 3 such cables are passed over pulleys 33 and secured at the free ends thereof to one of the pins 30. When the drums 31 are rotated the platform 6 will move from the position shown in full lines to the position indicated in broken lines. In Fig. 4 the cables 32 are directly secured to the hooks or pins 30, and the rotary movement of drums 31 caused the platform 6 to move from the position shown in broken lines to the position shown in full lines. The directions of the movement are indicated by the respective arrows.

The embodiment of Figs. 3 and 4 is particularly useful as the cables 32 may be long enough to move the platform not only whilst at least a portion thereof is on the truck but also to move it towards the truck when it is on the floor of a storing place or on an auxiliary device as shown in Fig. 5.

It will be understood that in either of the embodiments shown, the rails 5, 23, 27 may be omitted if at least some of the transverse members 7 are provided with rollers adapted to move over a substantially smooth surface. It will further be understood that the mechanism for moving the platform 6 may be further modified. Thus for instance, an endless chain engaging with protruding members associated with the lateral sides or the lower face of members 7 may be employed. Furthermore, the truck may be provided with arrangement allowing several platforms to be placed on the truck at different levels. The articulations of the members 7 may be disengageable so that only a portion of the platform 6 may be removed from or placed on the truck. All these and similar variations which can be easily designed on the basis of the foregoing disclosure are intended to be included in the annexed claims.

I claim:

1. In and for a motor vehicle having a load supporting platform and a pair of pinions adapted to be driven by the motor in either direction and located near the rear end of the load supporting platform, a movable platform adapted to be moved in a longitudinal direction onto and from said vehicle, which comprises a plurality of transverse members each having a load supporting surface, pivotal connections between any two adjacent transverse members, each including a pivot extending transversely to the longitudinal axis of the platform; wheels or the like supporting at least some of said transverse members; and a pair of racks secured to each transverse member at a lateral side thereof and adapted to engage said pinions.

2. In and for a motor vehicle having a load supporting platform and guiding means extending longitudinally at each side of said platform, a movable platform adapted to be moved in a longitudinal direction onto and from the vehicle, which comprises a plurality of transverse members each having a load supporting surface; pivotal connections between any two adjacent transverse members, each including a pivot extending transversely to the longitudinal axis of the platform; wheels or the like supporting at least some of said transverse members; and means adapted to apply a force in a longitudinal direction to said platform; each transverse member having lateral projecting extensions to engage said guiding means.

3. In and for a motor vehicle having a load supporting platform and a drum adapted to be driven by the engine, a movable platform adapted to be moved in a longitudinal direction onto and from said vehicle, which comprises a plurality of transverse members each having a load supporting surface; pivotal connections between any two adjacent transverse members, each including a pivot extending transversely to the longitudinal axis of the movable platform; wheels or the like supporting at least some of said transverse members; and flexible means adapted to be wound on said drum and to be secured at the free end thereof to said movable platform.

4. An arrangement as claimed in claim 3 wherein said drum is located at the forward end of said load supporting platform and a pulley is located at the rear end thereof.

References Cited in the file of this patent

UNITED STATES PATENTS

| | | |
|---|---|---|
| 1,387,163 | Munzlinger | Aug. 9, 1921 |
| 2,485,300 | Lisota | Oct. 18, 1949 |
| 2,516,881 | Jarvis | Aug. 1, 1950 |
| 2,606,677 | Snedeger | Aug. 12, 1952 |
| 2,659,504 | Kranawetvogel et al. | Nov. 17, 1953 |
| 2,679,941 | Roesies | June 1, 1954 |